J. H. SHIREMAN
HORSE RAKE.

No. 36,426. Patented Sept. 9, 1862.

UNITED STATES PATENT OFFICE.

JOSEPH H. SHIREMAN, OF EAST BERLIN, PENNSYLVANIA.

IMPROVEMENT IN HORSE-RAKES.

Specification forming part of Letters Patent No. 36,426, dated September 9, 1862.

*To all whom it may concern:*

Be it known that I, JOSEPH H. SHIREMAN, of East Berlin, in the county of Adams and State of Pennsylvania, have invented a new and useful Improvement in Horse Hay-Rakes; and I do hereby declare that the following is a full and exact description thereof, reference being had to the accompanying drawings, and to the letters of reference marked thereon, like letters in the several figures indicating the same or analogous parts, and in which drawings—

Figure 1:
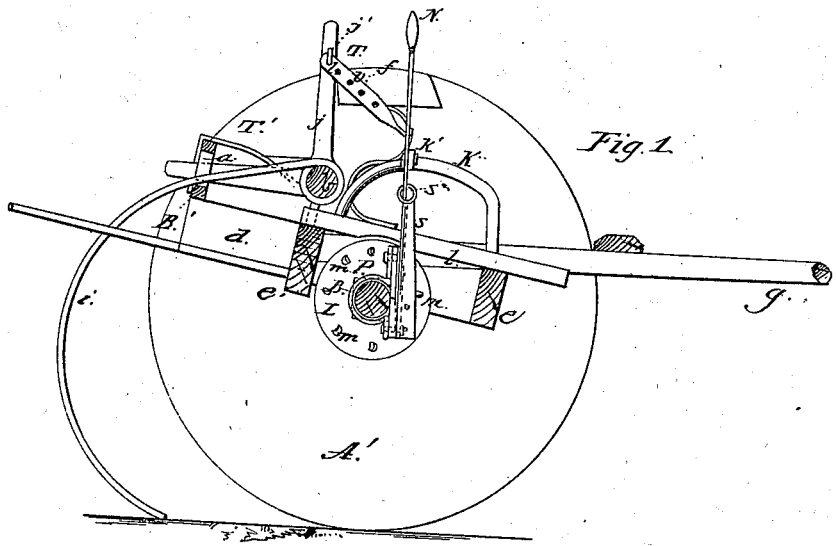
Figure 2:
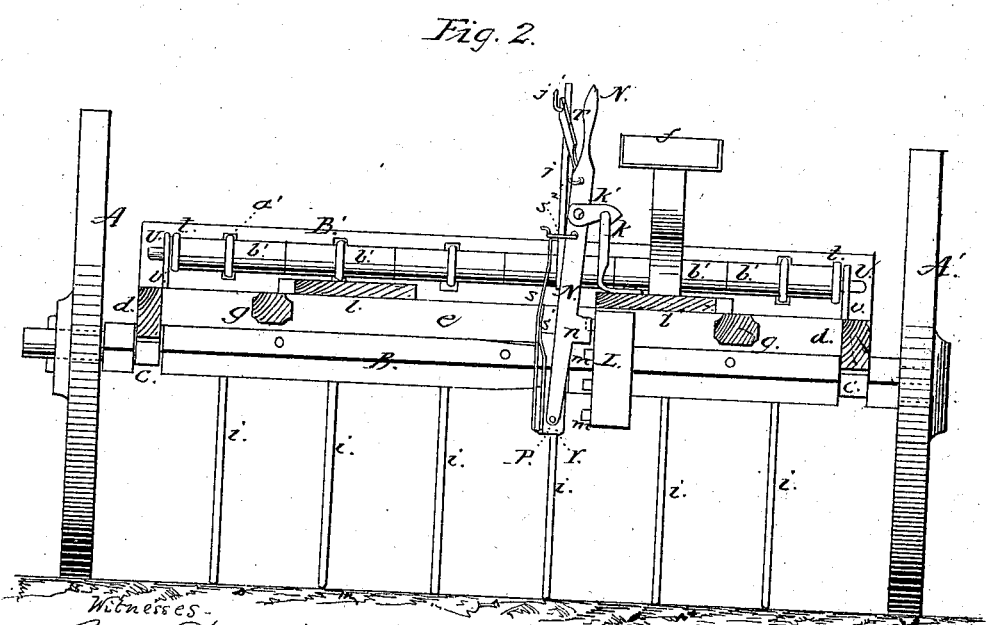

Figure 1 is a longitudinal section, showing the attachment of the hand-lever to the axle of the rake; and Fig. 2 is a front sectional view of said lever, together with the main operating parts of the machine.

In the drawings, A indicates a wheel which revolves loosely upon the axle B, and A' a wheel firmly attached to said axle and revolving with it. Collars, as at $cc$, are attached to the under side of beams $dd$, which constitute the sides of the main frame of the machine, said beams $cc$ being connected with transverse beams $e\ e'$ in front and in rear of the axle, as shown, thus forming a support for the driver's seat $f$, thills $gg$, cross-bar B', rake-teeth $i$, elbow-lever $j$, and inclined way $k$. The main frame and parts supported by it are thus sustained by and articulate upon the axle at $cc$. Planks $l$ and $l'$ are secured to the cross-beams $e\ e'$, as shown, the latter one, $l'$, serving as an immediate support to the driver's seat $f$ and also to the inclined way $k$.

The driver's seat, it will be observed, is situated to the left hand of a point central of the length of the axle B, and near the wheel A', so that the weight of the driver when occupying the seat will be thrown mainly upon the wheel, which is permanently attached to said axle. By this means the firmness of the "tread" of the wheel A' is increased, and a liability of its slipping upon the ground when the rake-teeth are charged with a heavy draft of hay is avoided.

On the axle B, beneath the driver's seat, a cog-wheel, L, is permanently attached, so as to revolve with the wheel A' and the axle. Cogs $m$, as shown, project from the working-face of said cog-wheel, and as the wheel A' revolves "take" against the lip $n$ of the hand-lever N, thus forcing said lever to articulate on said axle and move forward in the direction of the rotation of said wheel, as will be described. Nearly central of the length of the axle a loose collar, P, is made to embrace the axle, as shown, and articulates freely thereon. To this collar, as at $r$, the lower end of the hand-lever N is pivoted, so that it may be made to approach the cog-wheel L by the hand of the driver or be drawn away therefrom by the action of a spring, $s$ and $s'$, applied as shown, the main spring $s$ at its upper end being connected to the hand-lever by the link $s^2$. As represented, a perforated bar, T, connects the hand-lever with the upper limb of the elbow-lever $j$, which has its axis of motion on the bar or rod U, upon which the rake-teeth $i$ articulate. The effective length of the bar T may be at will increased or diminished by inserting the hook $j'$ of the elbow-lever $j$ into either one of the perforations through said bar, as may be desired. The lower limb of the elbow-lever is made to project through an aperture, $a$, in the cross-bar B', through which apertures, as at $a'$, are also made for the rake-teeth to pass, and within the length of which apertures or slots $a'$ the rake-teeth are permitted to rise and fall to accommodate them to the inequalities of the surface of the ground over which they may travel. Rod U at its ends is supported by uprights $v\ v$, as indicated, said uprights being driven into or otherwise properly secured to the framing $dd$, as shown. This rod, as represented in the figures, passes through a series of rollers, $b'$, to which the inner ends of the rake-teeth are secured, each one of said rollers playing loosely upon the rod U and independent of each other. Connecting-bars T', as shown, support the cross-bar B upon the rod U, the forward ends of bars T' being attached at or near the ends of the cross-bar B', and their rear ends, $t$, being perforated, so that the rod U may pass through them, and thus hold them in proper position, while at the same time they are permitted to work freely upon said rod. As the elbow-lever $j$ is also provided upon the rod U, it is evident that when the rake-teeth $i$ are elevated from the position shown in the drawings they will rise coincident with the cross-bar B', through which they pass, and that as the cross-bar and the rake-teeth have the same axis of motion, U, the teeth will simply rest upon the cross-bar in the act of elevation or depression, instead of being thrust longitudinally through the slots $a'$ in the bar, thus causing friction and increasing the draft of the machine.

A catch, $k'$, is pivoted to the hand-lever N, so that when the hand-lever is made to approach the inclined way $k$ it will engage with the latter and hold the hand-lever in the position shown in Fig. 2.

We will suppose that the machine has gathered a desirable quantity of hay to form a windrow, and that the hand-lever is still occupying its normal vertical position, and with its lip $n$ out of contact with the cogs of the wheel L, and that the driver or operator is desirous of discharging the hay. To effect the discharge the operator will grasp the lever N with his right hand, and by drawing it toward him a proper distance the lip $n$ of the lever will be brought within the path of revolution of the cogs $m$ of the wheel L, and the catch $k'$, striking the inclined way $k$, will engage with it, as shown in Fig. 2. In this position of the hand-lever the continued rotation of the wheel A' will turn the hand-lever upon the axle B with a downward and forward movement until the catch $k'$ has traversed the face of way $k$ and has also passed beyond the forward portion of said way, at which movement the tension of the springs $s$ and $s'$ will cause the lever to resume its vertical position, thus freeing it from contact with the cog-wheel L. It is evident that during such movement of the hand-lever the rake-teeth $i$ will be elevated upon and with the cross-bar B' through the instrumentality of the elbow-lever $j$ and connecting-bar T, and that the time at which the rake-teeth will be permitted to fall back into the position shown in the drawings will depend upon the working length of the bar T, according as it is hooked to the elbow-lever $j$ in one or the other of its poles $v'$.

It is also apparent that the driver, with a backward draw upon the hand-lever N, can, through the instrumentality of the connecting-bar T, elbow-lever $j$, and cross bar B', force the rake-teeth $i$ down to their work—an operation which is very necessary, since after the teeth gather a quantity of hay, but less than enough to warrant its discharge, the tendency of the teeth is rise from the ground and not perform clean work.

Having thus described my invention, what I claim as new, and desire to secure by Letters Patent of the United States, is—

1. Suspending the hand-lever N upon the axle B, so that the former may articulate upon the latter, in the manner and for the purpose described.

2. The inclined way $k$, in combination with the hand-lever N, arranged and operating substantially in the manner and for the purpose set forth.

3. The perforated bar T, in combination with the hand-lever N and inclined way $k$, substantially in the manner and for the purpose set forth.

Witness my hand and seal in the matter of my application for a patent for improvement in horse hay-rakes this 22d day of July, A. D. 1862.

J. H. SHIREMAN. [L. S.]

Witnesses:
GUSTAVUS DIETERICH,
EDWIN S. JACOB.